United States Patent [19]

McMillin

[11] 3,820,068

[45] June 25, 1974

[54] BACKGROUND REFERENCE LEVEL SYSTEM AND METHOD FOR DOCUMENT SCANNERS

[75] Inventor: John V. McMillin, Iowa City, Iowa

[73] Assignee: Westinghouse Learning Corporation, Iowa City, Iowa

[22] Filed: June 29, 1972

[21] Appl. No.: 267,471

[52] U.S. Cl...340/146.3 AG, 250/219 DC, 235/61.11 E, 307/235

[51] Int. Cl. .............................................. G06k 5/00

[58] Field of Search.... 340/146.3 AG; 325/61.11 E; 307/235; 328/116; 250/220 C, 219 D, 219 DC, 209

[56] References Cited

UNITED STATES PATENTS

| | | | |
|---|---|---|---|
| 3,159,815 | 12/1964 | Groce | 340/146.3 AG |
| 3,667,057 | 5/1972 | Pfersch et al. | 307/325 |
| 3,701,099 | 10/1972 | Hall et al. | 340/146.3 AG |

OTHER PUBLICATIONS

A. E. Villante, Automatic Threshold Control Circuit, IBM Tech. Disclosure Bulletin, Vol. 5, No. 6, Nov. 1962, pp. 55–56.

*Primary Examiner*—Raulfe B. Zache
*Assistant Examiner*—Joseph M. Thesz, Jr.
*Attorney, Agent, or Firm*—James C. Nemmers

[57] ABSTRACT

A self-checking system for electronic document scanners of the multiple data channel type that detect data in the form of pencil marks on the document. The data channels are used to measure the reflectance level of the document background immediately before any data marks are presented for detection, and the output of the channels are averaged to arrive at a background level. This background level is then used as a reference level for reading the marks. With this system, maximum sensitivity in all data channels is attained thus allowing optimum discrimination in detecting marks in the data area of the document. This background level is also used to automatically check the performance of the system so as to identify any malfunctions in the system or any variance in individual channels beyond predetermined limits.

12 Claims, 9 Drawing Figures

ROW "O"

| | MARK DETECTION AMPLIFIER OUTPUT | |
|---|---|---|
| | $t_1$ | $t_2$ |
| CORRECT | O | I |
| TOO POSITIVE | I | I |
| TOO NEGATIVE | O | O |
| UNSTABLE | VARIBLE OR INTERMITTENT | |

BACKGROUND REFERENCE LEVEL SYSTEM AND METHOD FOR DOCUMENT SCANNERS

BACKGROUND OF THE INVENTION

This invention relates to the processing of data and more particularly relates to an apparatus and system for scanning and "reading" documents to obtain information recorded thereon. Documents of the type to which the invention relates are those containing manually marked responses such as answers to standardized objective tests, census surveys, market surveys, etc. One application of the invention is for use in automated optical scanning of position-coded pencil-marked information of the type disclosed in my U.S. Pat. No. 3,486,040 issued Dec. 23, 1969 entitled "Selectively Controlled Transistor Discriminator Circuit". Another application or use for the invention is in connection with discriminator circuits for document readers as set forth in my U.S. Pat. No. 3,692,982 issued Sept. 19, 1972, and entitled "Digitally Converted Analog Discrimination System".

One of the practical difficulties in the electronic optical scanning of pencil marked documents is the fact that the density, opacity, blackness or readability of marks made in the field is extremely variable. Causes for the variance in the density of marks are many and include the hardness of the pencil used, the pressure applied by the person making the mark, as well as the many difficulties resulting from erasures, failure to completely fill in the response area, etc. As a result of these practical difficulties, discriminator circuits of the type referred to in my earlier inventions have been developed. All of these circuits, however, depend upon a basic reference level from which the intensity or blackness of the mark is determined. Since all of the electronic document readers measure light intensity either reflected from the document or transmitted through it, the basic reference level depends upon the paper used in making the document, including its color, opacity, quality, etc. Some prior art systems use a fixed threshold system which is preset and remains constant except for variation caused by the hardware of the machine itself. Other prior art systems use a monitor channel containing a single photo sensitive device which reads a "no print" strip along the scan length of the document. This provides a dynamic reflectance measurement and thus has advantages over a fixed threshhold system in that the reflectance level used as the basic reference level will vary according to the document background. Unfortunately, experience has taught that the "no print" strip very often contains extraneous marks caused by doodling, dirt smudges resulting from handling, etc. As a result, the reflectance level may vary quite radically as the single monitor channel picks up an extraneous mark, smudge, etc. In addition to variances caused by the document reflectance, the reference level set by a single monitor channel will fluctuate the entire amount of any variance caused by signal temperature drift, ambient temperature changes, aging effects or other variations associated with the scanner hardware itself. At the present time, there is no known way of compensating for unwanted variances caused by either the document itself or the scanner hardware and there is no way for detecting such variances if they occur. Because present day electronic document scanners are very sophisticated and, therefore, very sensitive to even slight differentials between the monitor channel and the data channels, the single monitor channel that varies a reference level because of temperature changes or because it detects smudges, extraneous marks, etc., will produce erroneous results, and the validity of the data being read will, therefore, be adversely affected. Although discrimination systems such as that shown in my U.S. Pat. No. 3,692,982 minimize such erroneous results, such systems must depend upon a basic reference level which if inaccurate will produce erroneous results in spite of the sophistication and sensitivity of the discrimination system. There is, therefore, a need for an improved system for determining a basic reference level and varying that level only when proper conditions dictate.

SUMMARY OF THE INVENTION

The invention provides a system in which all of the data channel photo transistors scan a blank area starting at the lead edge of the document and continuing for a pre-determined distance ahead of the data area. This area along the lead edge of the sheet is a "no print" area, and the reflectance level signals for all of the data channels are algebraically combined into one composite signal that represents the background reflectance level for the given document. This background reflectance level is electronically stored prior to the time that the data rows are scanned, and it serves as a common comparator level for each data channel to reference against in detecting the presence of data on the document. This background reflectance level is also utilized as the basis for an automatic self-checking system to check the performance of each data channel. Immediately following the algebraic combination of the reflectance level signals for all the channels into an average reflectance level signal, each channel is then compared with this average reflectance level signal. If the channel output signal is not within certain preset limits from the average signal, the coded output from each channel will so indicate. This output can be used to halt the processing so that the cause of the variance can be determined. The invention thus provides an almost fail-safe system which produces optimum sensitivity in the mark detection circuits. The ultimate result is greatly improved accuracy in document scanning in spite of the many practical difficulties encountered in the past with documents that have been damaged, become dirty, smudged, doodled upon, etc. The invention accomplishes this result with very little additional hardware and thus the cost is very low, particularly when compared with the greatly improved results obtained.

The foregoing features of my novel system as well as additional features will be more readily evident from my description of the preferred embodiment contained herein taken in connection with the accompanying drawings, a brief description of which follows.

DESCRIPTION OF THE PREFERRED EMBODIMENT OF THE INVENTION

Figure 1:
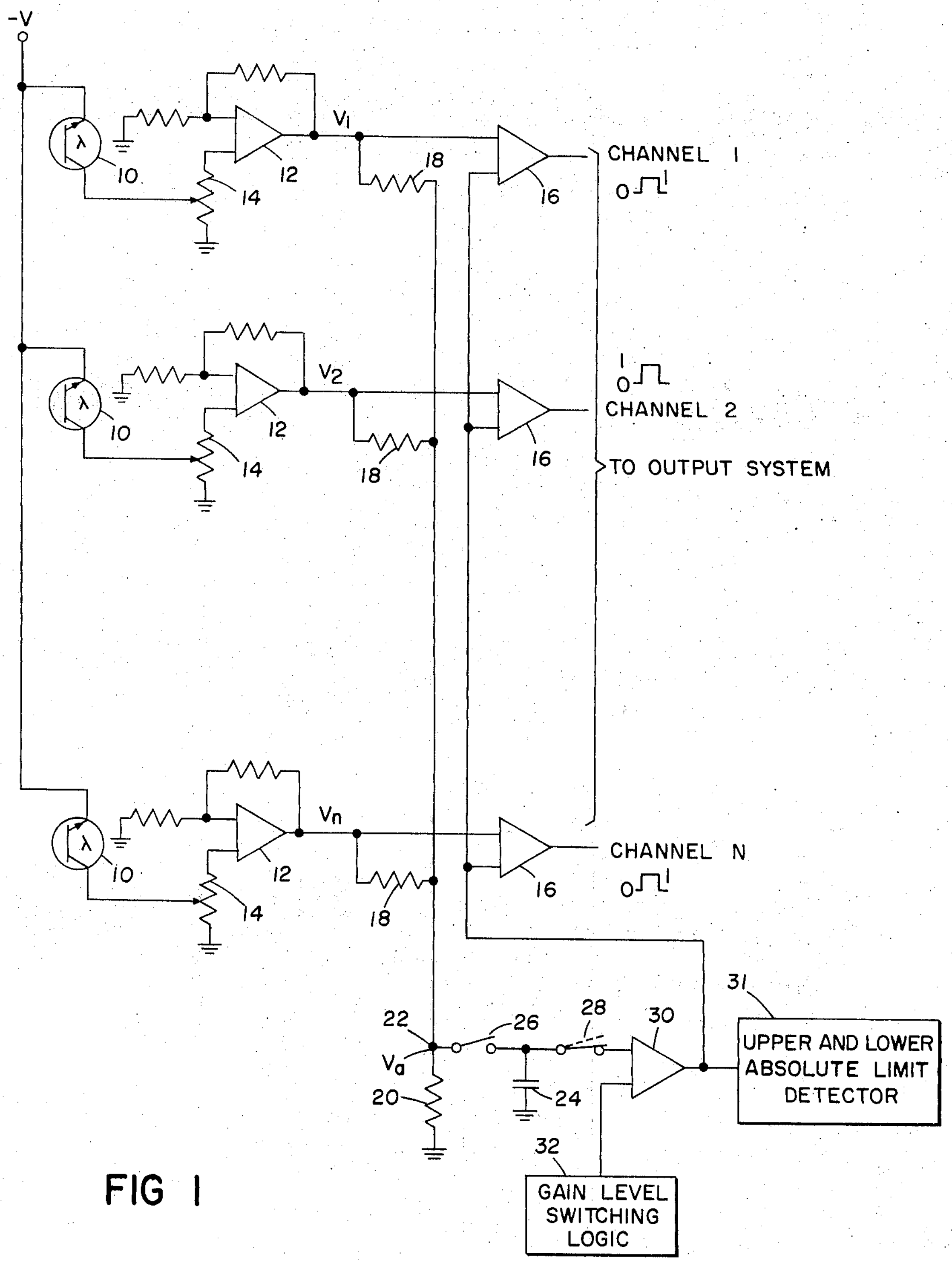
FIG. 1 is a simplified diagram showing a portion of several typical data channels combined with circuitry for producing the average reference signal.

Referring first to FIG. 1, there is diagrammed a portion of a typical circuit for the data channels for scanning documents containing multiple data response areas which are normally arranged in columns and rows. A document scanner of the general type to which the invention relates is disclosed in Lindquist U.S. Pat. No. 3,050,248 issued Aug. 21, 1962, entitled "Methods and Apparatus for Processing Data", said patent also disclosing a document format containing multiple data response areas. It will be understood by those skilled in the art that the circuitry represented in FIG. 1 is only a portion of the total circuitry of the document scanner, and that the invention has application for use in connection with discriminator circuits such as those shown in McMillin U.S. Pat. No. 3,486,040 previously referred to in the "Background of the Invention". The principles of the invention can be applied to any multiple channel scanner, and FIG. 1 illustrates three such channels for a scanner having "N" channels. In such scanners, there is generally an optical scanning head (not shown) containing a plurality of parallel-channel photo transistors 10 or similar detectors capable of sensing the intensity of light and producing a signal in proportion thereto. As is well known to those skilled in the art, the photo transistors 10 are mounted in alignment so as to be perpendicular to the direction of sheet travel, and, therefore, parallel to the sheet lead and trailing edges. The output of each photo transistor 10 is fed into an operational amplifier 12 through a gain adjustment potentiometer 14. Amplifiers 12 are of the linear gain type, and the potentiometer 14 in each channel is adjusted so that the input to each amplifier 12 is the same when the photo transistors 10 sense the same amount of light intensity. The gain adjustment provided by potentiometers 14 thus compensates for the variation in gain between individual photo transistors and thereby makes it possible to tune each channel for the same reflectance step level output from the amplifiers 12. In practice, a sample sheet is run through the document scanner and the potentiometers 14 adjusted accordingly so that the same output is produced from the operational amplifiers 12. It will be understood that the voltage output of the amplifiers 12 will be zero when no light is detected by photo transistors 10. However, when a photo transistor 10 detects light, such as that reflected from the surface of a document, the output of the corresponding amplifier 12 goes negative to a voltage level representing the amount of reflectance from the document. Any mark on the paper which reduces the light intensity to a photo transistor 10 will cause the output of amplifier 12 to go positive from the negative level, the amount depending on the density (darkness) of the mark detected. The peaks in FIGS. 2 and 3 of the drawing represent marks of varying densities, and a theoretically perfect "black mark" would cause the output of amplifier 12 to return all the way to zero volts. If the channels have been properly tuned, a mark of a given density in one channel will produce the same upward excursion and signal level in the output of amplifier 12 as a mark of the same density detected by the photo transistor 10 in another channel. The amplifier 12 in each channel serves to linearly amplify the output signal from the photo transistor 10 to a level sufficient for reliable discrimination and also serves to drive the logic comparator or mark detection amplifier 16 in each channel which amplifier 16 receives the output signal from a respective one of the operational amplifiers 12.

The output of each operational amplifier 12 is also fed through a decoupling resistor 18 to a summing resistor 20. The voltage $V_a$ at the summing junction 22 is thus equal to:

$$V_a = \frac{\frac{V_1}{R_{s1}} + \frac{V_2}{R_{s2}} + \ldots \frac{V_n}{R_{sn}}}{\frac{1}{R_{s1}} + \frac{1}{R_{s2}} + \ldots \frac{1}{R_{sn}} + \frac{1}{R_a}}$$

where $V_1$, $V_2 \ldots V_n$, represent the output voltage of each respective channel's operational amplifier 12; $R_{s1}$, $R_{s2} \ldots R_{sn}$, represent the decoupling resistor 18 for each channel; and $R_a$ is the summing resistor 20. Since all the decoupling resistors 18 are normally set at an equal value, the expression for $V_a$ may be simplified to:

$$V_a = \frac{\frac{1}{R_s}(V_1 + V_2 + \ldots V_n)}{\frac{N}{R_s} + \frac{1}{R_a}}$$

$$= \frac{V_1 + V_2 + \ldots V_n}{N + \frac{R_s}{R_a}} = \frac{A(V_1 + V_2 + \ldots V_n)}{N}$$

Thus $V_a$ is equal to the sum of the output voltages of each amplifier 12 divided by the number of channels $N$ multiplied by a scaling factor $A$ which equals:

$$A = \frac{1}{1 + \frac{R_s}{NR_a}}$$

In practical systems, $R_a$ is normally small with respect to $R_s$, and a typical ratio between the two resistors is $R_a = R_s/N$. For this value, the scaling factor $A$ equals:

$A = 1/1 + (1/1) = 0.5$. Thus, where all the output voltages from the operational amplifiers 12 are equal (i.e., proper channel tuning has been performed) then $V_a = 0.5 \times V_t$, where $V_t$ is the typical output voltage from a channel.

The average voltage $V_a$ which appears at junction 22 is then stored in a holding capacitor 24 if sample switch 26 is closed. At the end of the "sampling period" more fully described hereinafter, switch 26 is opened simultaneously with the closing of hold switch 28. At this time the stored voltage across the holding capacitor 24 is connected to the input of the sample-and-hold amplifier 30 (hereinafter SH amplifier 30). The sample switch 26 and hold switch 28 are shown in the drawings as mechanical simple-series switches for clarity. In actual practice, however, these switching functions are provided by high speed electronic field effect transistor switches which have a low "on" resistance and an extremely high "off" resistance. Use of this type of switch eliminates any appreciable "voltage droop" in the stored charged of capacitor 24 for the duration of the document scan cycle, typically in the 50 millisecond to 1,000 millisecond range for most document scanners.

The gain of the SH amplifier 30 is typically set for $1/A$, $A$ being the scaling factor of the resistor average circuit as previously described. Thus, the SH output voltage $V_{SH}$ is theoretically equal to: $V_{SH} = (V_1 + V_2 + \ldots V_n)/N$.

The SH amplifier 30 is set at a constant gain, but its gain is preferably adjustable by suitable switching logic 32 so that the output voltage can be set slightly higher (or slightly less if dealing with positive voltages) then the typical voltage output from an operational amplifier 12. This avoids picking up light erasures or small random variations in the paper reflectance itself.

The output of SH amp 30 is fed to the input of each mark detection amplifier 16. It should be understood, however, that if the principles of my invention disclosed herein are used in connection with a more complex discrimination system such as that disclosed in my U.S. Pat. No. 3,692,982, then the output of SH amplifier 30 would not be fed directly into the mark detection amplifiers 16 but rather would be used to drive the clock system and establish the basic reference level for the clock system that is disclosed in said U.S. Pat. No. 3,692,982.

Figure 3:
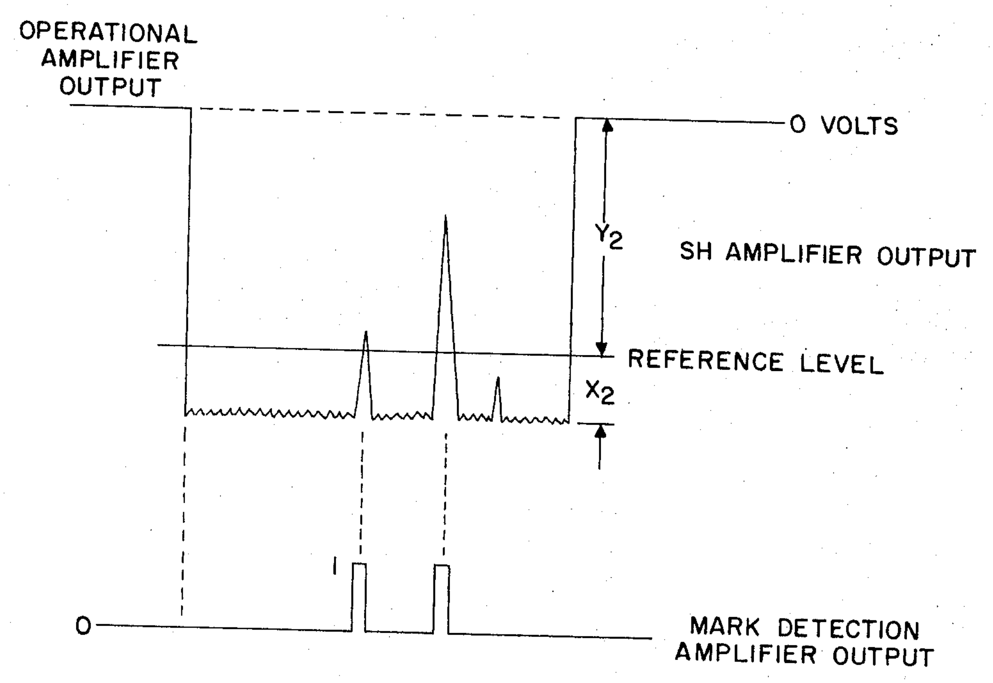
FIG. 3 is a diagram similar to FIG. 2 and illustrating the adjustability of the system for a reflectance level different then that shown in FIG. 2.
Figures 3A, 4:
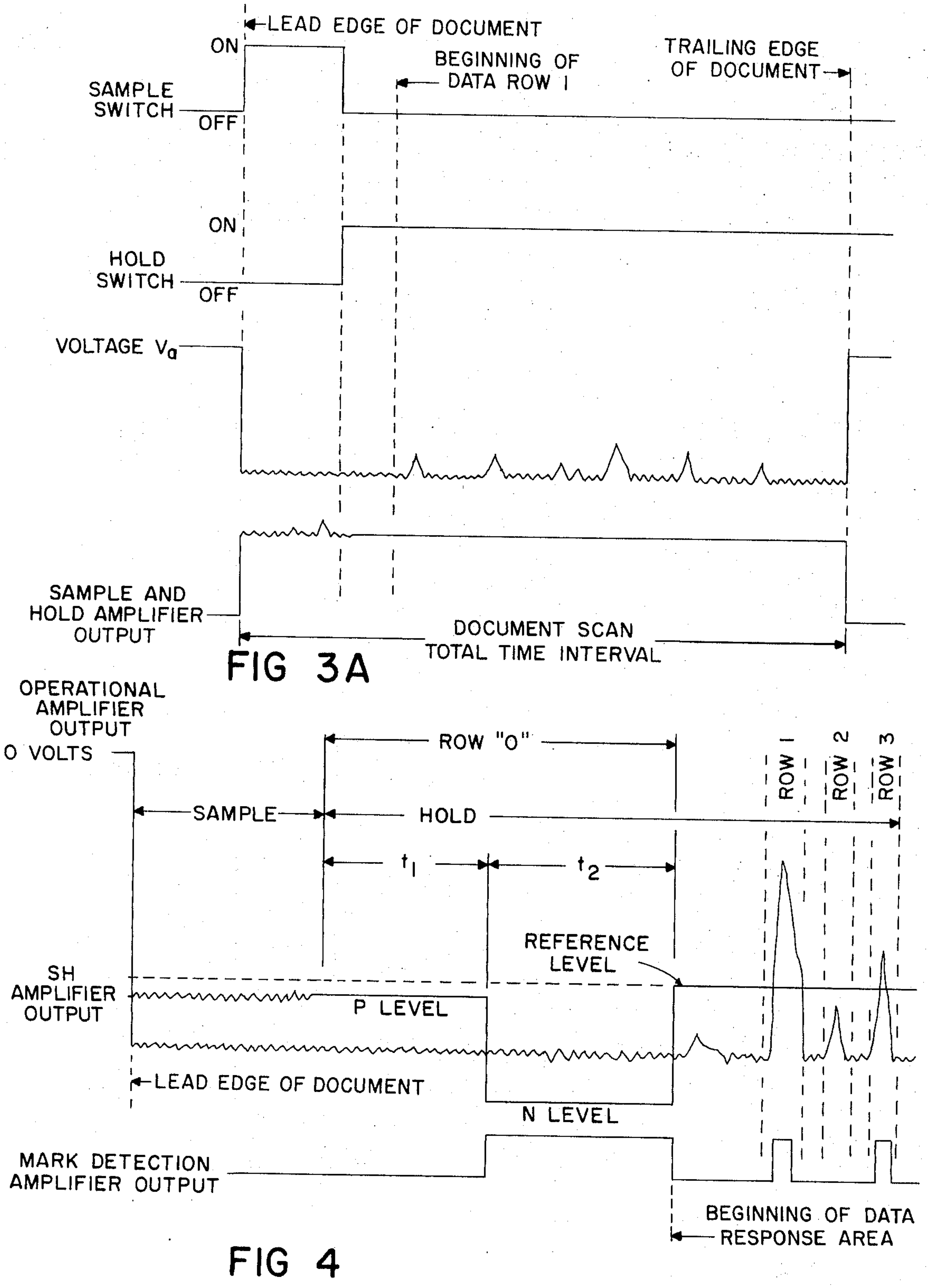
FIG. 3A is a chart illustrating in a graphical manner the functions of the circuitry of the invention during the time sequence of a single document.
FIG. 4 is a chart illustrating the patterns produced in a properly tuned data channel during the sampling and self-checking period at the beginning of a document scan.

The "sample" period during which the voltage averaging of the operational amplifiers 12 takes place (resulting in $V_a$ being stored across capacitor 24), can occur as soon as the lead edge of each document has been moved beneath all of the photo transistors 10. In practice, the sampling period starts a short distance from the lead edge of the document in order to avoid "reading" any irregularities or damage to the lead edge. This also allows time for the circuits to stabilize. The sampling period, therefore, typically begins when a sheet lead edge detector (not shown) closes sample switch 26 and ends when sample switch 26 is opened and hold switch 28 is closed, all of this being accomplished by a time delay device (not shown) set to allow approximately one-eighth to one-quarter of an inch along the lead edge of a document to pass beneath the photo transistors 10. Of course, the document format must be designed so that the portion of the document from the lead edge to data row 1 is blank. The time relationships for the opening and closing of the sample switch 26 and hold switch 28 are illustrated in FIG. 3A together with a representation of the voltage $V_a$ and a representation of the output of SH amplifier 30.

Figure 2:
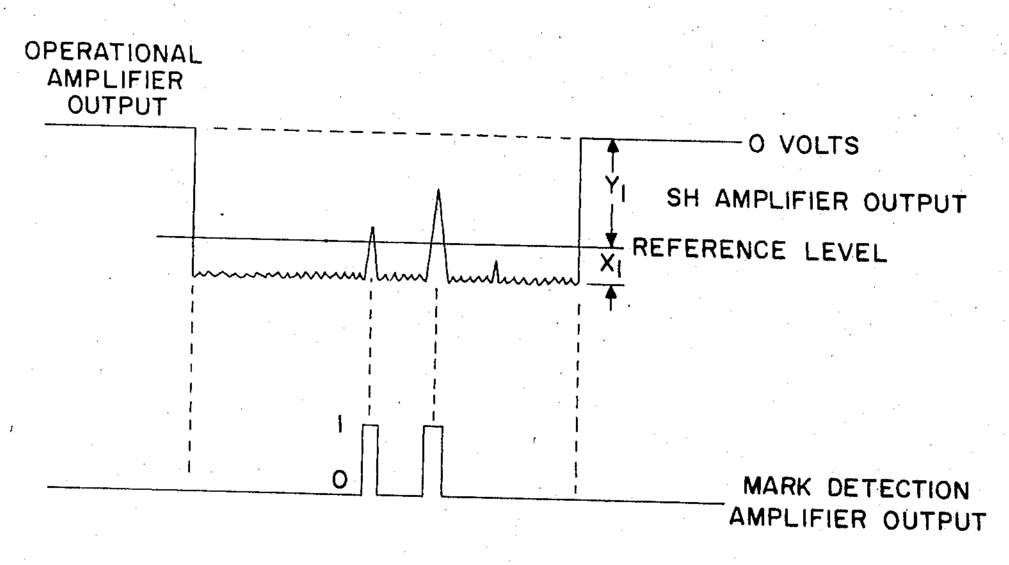
FIG. 2 is a diagram illustrating the output of a typical data channel and further illustrating a reference level determined according to the principles of the invention.

The mark detection amplifiers 16 each receive an input from the operational amplifier 12 in its channel together with an input received from SH amplifier 30. An output (logic 1) is produced by amplifier 16 whenever the output from the operational amplifier 12 is greater than the output from SH amplifier 30. This is illustrated in FIGS. 2 and 3 which illustrate a typical channel output for different reflectance step magnitude levels "A" and "B". As previously described, the output of SH amplifier 30 represents the true mean-reflectance level of the particular document being scanned during the sample period. In other words, the output from SH amplifier 30 represents the background reflectance level of the document. As previously indicated, the gain of SH amplifier 30 is adjustable by switching logic 32 so that the output is slightly more positive than the typical output of an operational amplifier 12. This sensitivity level, represented by $x_1$ and $x_2$ in FIGS. 2 and 3, respectively, establishes a minimum detection threshhold which will vary in direct proportion with the "drifting" upward or downward of all the data channels in response to variations in the reflectance level of the paper, ambient temperature variations, etc. In other words, even though $(x_2 + y_2)$ is greater than $(x_1 + y_1)$, the ratio of the sensitivity level "$x$" to the value $y$ will remain constant, or $(x_1/y_1) = (x_2/y_2)$, which constant is termed the "threshhold ratio". This allows the system to automatically compensate for the simultaneous drifting upward or downward of all of the channels because the true-average output of the SH amplifier 30 will indicate the mean shift in the overall signal level. Thus, the output of each mark detection amplifier 16 will be the same for the same relative density (darkness) of data marks, regardless of whether such marks were made on high-reflectance or low-reflectance paper. The invention, therefore, provides for the intermixing of a variety of documents regardless of the paper, its color, quality, etc., and provides a system that is fully automatic and self-tracking which is particularly important in sophisticated multi-level detection schemes employed in discrimination systems such as those disclosed in U.S. Pat. No. 3,486,040 and my U.S. Pat. No. 3,692,982.

The automatic self-tracking feature that has been described also automatically compensates for minor signal changes in a channel caused by temperature variations in the processing environment, aging effects of the photo transistors or of the light source for the document scanner itself and, of course, variations in the background reflectance of the documents themselves. If desired, the system can be designed so that any cumulative change caused by these variances and exceeding predetermined limits will produce a signal so that proper corrective action can be initiated.

An extremely important feature of the invention is the automatic capability of the system to check each and every data channel before the scanning of each document to verify that the output of each data channel is within preset limits above or below the ideal "tune value". Immediately following the sample period and before scanning the data in document row 1, the photo transistors 10 scan an area of the sheet designated as row "zero". This short distance on the sheet (or small interval of time) is reserved for self-checking of the system. With reference to FIG. 4, note that row "zero" is scanned immediately following the sample period but after hold switch 28 has been closed thus producing an output from SH amplifier 30 to all of the mark detection amplifiers 16. Note also that this is accomplished before any data marks are scanned, this being easily controlled by design of the document grid format. This self-checking function is accomplished by a "PN-limit check" (Positive/Negative) throughout the PN-check interval. During the scanning of row "zero", the output of the SH amplifier 30 is alternately cycled between "P-check" and "N-check" voltage limits. This is accomplished by suitable control logic in the gain level switching logic 32. During roughly the first half ($T_1$) of the PN-check interval, the control logic 32 sets the output of SH amplifier 30 to the P-level, and during the last half ($T_2$) of the PN-check interval the switching logic 32 sets the output of the SH amplifier 30 to a lower or N-level. These levels are illustrated in FIG. 4 and are arbitrary levels which are typically set at a value 10 percent to 15 percent above or below the typical channel output voltage from the operational amplifiers 12. As with the basic reference level set by SH amplifier 30 during the reading of the data responses, the P-level and N-level limits will automatically vary in direct proportion with the drifting upward or downward of the average voltage of the operational amplifiers 12. The PN-level checks are, therefore, also automatically self-tracking.

During the P-check interval (time $T_1$) the switching logic 32 will set the SH amplifier 30 output voltage at the P-level and consequently this voltage will be present at the input of the mark detection amplifiers 16 for all data channels. FIG. 4 illustrates a properly tuned data channel in which the output from the operational amplifier 12 will be slightly below the P-level output of the SH amplifier 30. Thus, there will be no output (logic "0") from the mark detection amplifier 16. During the N-level interval (time $T_2$) the output of SH amplifier 30 is switched to a level slightly below a correctly tuned channel output ot the N-level. Thus, the operational amplifier 12 of a properly tuned channel will have an output slightly above the N-level, and the mark detection amplifier 16 will produce an output (logic "1"). At the end of the scan of row "zero" (the PN-check interval) the switching logic 32 will cause the output of SH amplifier 30 to be switched to the predetermined background reference level and a properly tuned channel will thus detect those data marks, the density of which produce an output from operational amplifier 12 that is above the reference level. This will in turn produce an output (logic "1") from the mark detection amplifier 16. This is also illustrated in FIG. 4 in which the data response areas in rows 1 and 3 contained marks of a sufficient density for the output of mark detection amplifier 16 to so indicate by producing an output, logic "1".

Figure 5:
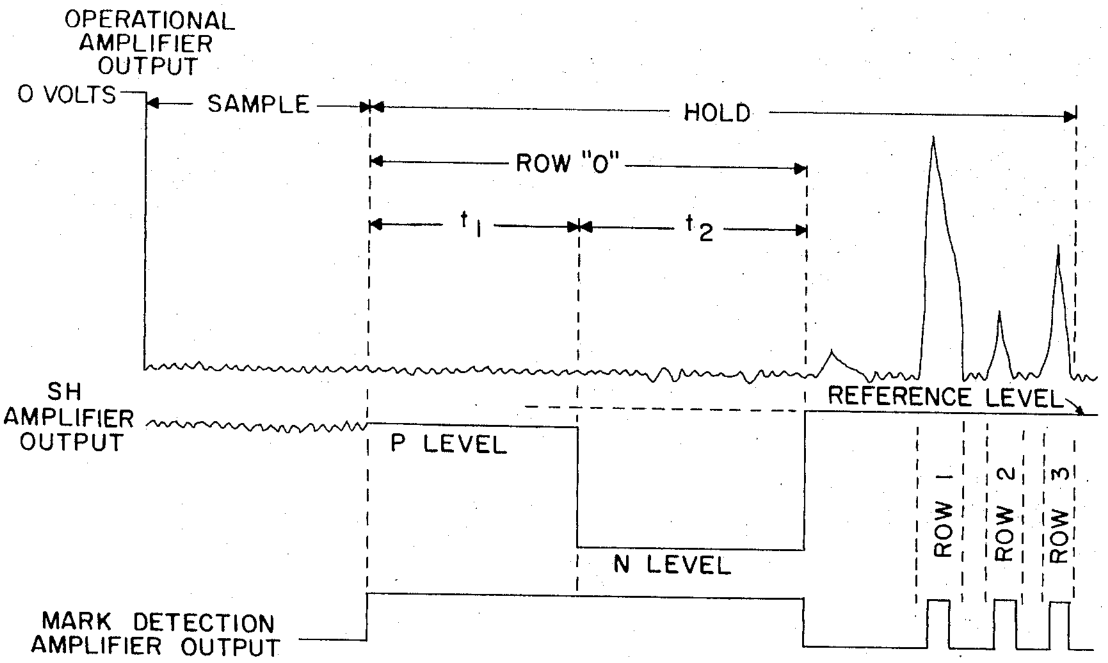
FIG. 5 is a chart similar to FIG. 4 but illustrating a channel which is out of tune and is too positive.

In FIG. 5 there is illustrated a data channel which is out of tune in the positive direction and thus is "too positive". During the P-level interval, the output of the operational amplifier 12 is above P-level voltage of SH amplifier 30 and thus the mark detection amplifier 16 will produce an output. This, of course, indicates that the channel is too positive. During the N-level interval, the "too positive" channel will, of course, also produce an output at mark detection amplifier 16 since the output of operational amplifier 12 is greater then the N-level voltage output of SH amplifier 30. The effect of a "too positive" channel in producing erroneous data indications is illustrated in FIG. 5. For the same data response marks, an output will be produced in a "too positive" channel for rows 1, 2 and 3 whereas a properly tuned channel (FIG. 4) would have produced an output for only rows 1 and 3. The value of the self-checking feature of the invention is evident in avoiding such erroneous data reading.

Figure 6:
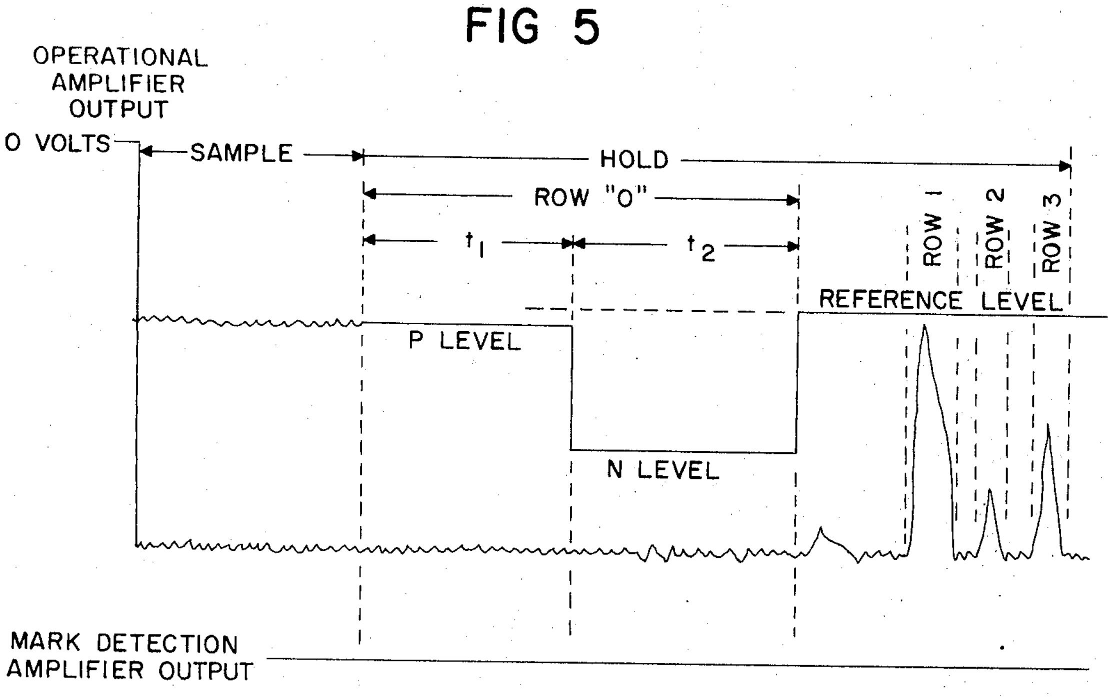
FIG. 6 is a chart similar to FIGS. 4 and 5 but ilustrating a data channel that is out of tune and too negative.

In FIG. 6, there is illustrated a "too negative" channel. When this occurs, the output voltage of the operational amplifier 12 will be below the P-level voltage of SH amplifier 30 and thus no output will be produced by the mark detection amplifier 16. However, because the channel is "too negative" the output voltage of the amplifier 12 will be below the N-level voltage during the interval $T_2$ and again no output will be produced by mark detection amplifier 16. If not corrected, FIG. 6 illustrates that data marks may be missed during the scanning of the data rows since the reference level voltage from SH amplifier 30 may be above the increased negative voltage produced by the operational amplifier 12 even when a dense mark is detected.

Figures 7, 8:
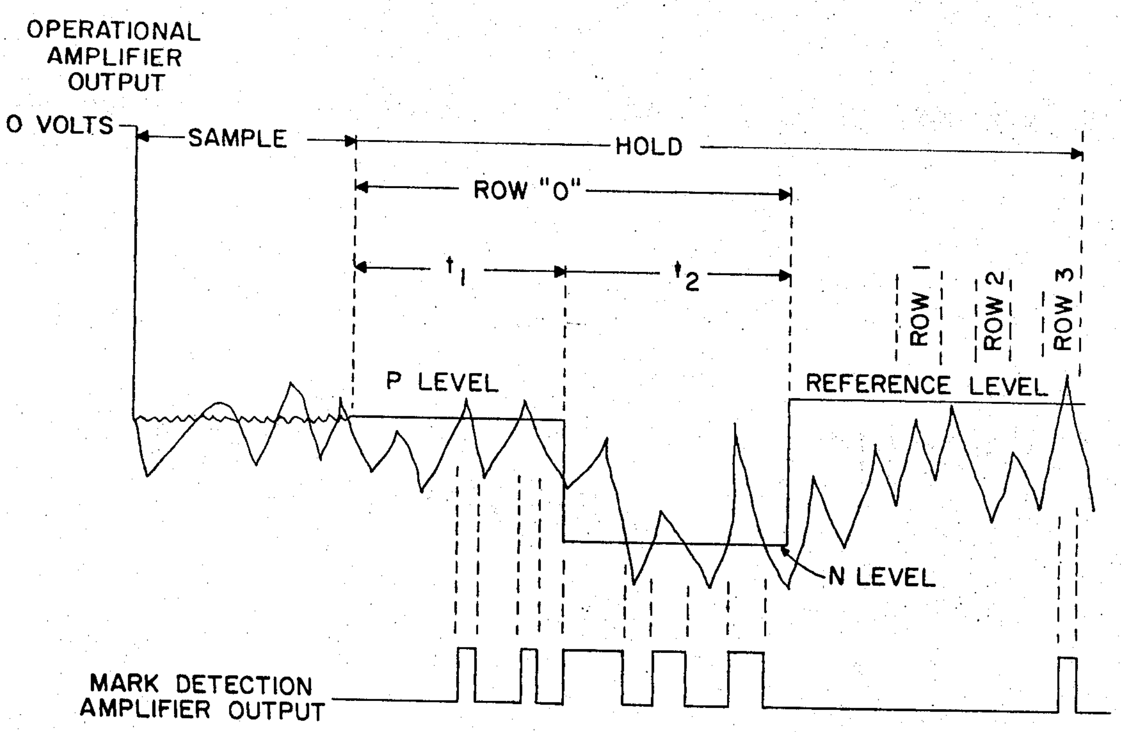
FIG. 7 is a chart similar to FIGS. 4, 5 and 6 but illustrating a data channel that is unstable.
FIG. 8 is a table showing the possible outputs from a data channel during the self-checking sequence.

FIG. 7 is an illustration of a noisy or unstable channel which will produce erratic or variable results during the P-level and N-level intervals. Obviously, such an unstable data channel will produce incorrect reading of the data rows.

FIG. 8 illustrates the outputs from the mark detection amplifiers for various possible conditions which can occur during the PN-check interval. Logic circuitry (not shown) attached to the output of the mark detection amplifiers 16 can decode whether the output pattern during the PN-check interval is correct, or the channel output is too high, or too low, or unstable. Since any channel having no voltage output or a voltage saturated channel is but an extreme case of lightly misadjusted channels, the failure is detected in a similar fashion, and thus the system has automatic capability to identify gross malfunctioning within a channel as well as misadjustments barely exceeding the PN-limits.

The output voltage levels of SH amplifier 30 that are required for the P-level and N-level checks are obtained by varying the theoretical $1/A$ gain scale factor slightly from the center-set value using the gain level switching logic 32. Thus, during the PN-check intervals, the SH amplifier output is scaled in an absolute sense to the corresponding value of document reflectance that was stored in capacitor 24 at the end of the sample period. In other words, during scanning of a given document, if all the data channels except the malfunctioning one (beyond the PN-limits) were at 120 percent or 80 percent of the so-called center-tune value, then the output of SH amplifier 30 during the PN-check interval would also be scaled up or down by 120 percent or 80 percent, respectively, so that the absolute percentage limit band of the PN-check tolerance limit is accurately maintained. There will, of course, be an error introduced into the averaged value ($V_a$) stored in capacitor 24, if any data channel output is beyond the P-level or N-level limits. The effect of this error is negligible, however, even in optical scanning systems containing as few as 26 data channels, which is the minimum number required for direct alphabetical field entry and detection. Since typical scanners used today have from 30 to 65 channels for standard 8 ½ inch wide documents, even a mulfunction which drives the output of an operational amplifier 12 to its maximum saturation value would be clearly detected. In such a case, the output of the operational amplifier 12 that is driven to its maximum saturation value would usually be about twice the typical output of the other channels. However, the output of SH amplifier 30 would increase only by about four percent which would be compared against the malfunctioning channel whose output has increased 100 percent (double). The malfunctioning channel would obviously be detected. The usual case, however, is not a complete channel failure but rather a random up or down drift of individual channels departing from the norm. These random up or down drifts of individual channels may be caused by uneven temperature variations across the scanning head containing the photo transistors 10, slightly different temperature coefficients among the photo transistors, development of hot spots from the light sources used in the document scanner, uneven dust build-up on the documents, etc. With the PN-level limits typically set at 10 percent to 15 percent above or below the nominal output voltage of a channel, then a single channel detected as out of limits would contribute only a 0.40 percent to 0.60 percent error in the output voltage of the SH amplifier 30. Thus, the data from the remaining data channels could still be scanned accurately, and equally important the PN-check performed on the remaining channels would still be valid because of the negligible error shift in the SH amplifier output level. It will be appreciated that during the scan of any given document quite a number of channels could be slightly beyond the PN-level limits and still be reliably detected as error channels, since the output of the SH amplifier 30 would be error shifted only slightly. Preferably, the PN-check is made independently on each document to be scanned, and could even be repeated a number of times during the scanning of a given document. Thus, any gradual degradation of the system will affect only a few channels at first but will give warning of a system failure.

The principles of the invention also permit the incorporation of a simple absolute limit voltage detector 31 attached to the output of the SH amplifier 30. Thus, if the output voltage of the SH amplifier 30 drops below a preset minimum value during scanning of a particular document, or exceeds a preset maximum value, this abnormal condition could be identified. Such a situation could occur if a drastically different paper stock were inadvertently mixed with the normal batch, or a different color of document intermixed with the normal batch of document, or a gross system failure occurred such as a light source burning out, a connector coming loose, or a grossly mistuned system. Thus, a document scanner employing the principles of the invention is thoroughly self-checking both against minor misadjustments and for gross malfunctions in one or more channels. Document scanners employing this self-checking system can utilize the outputs of the mark detection amplifiers 16 in conjunction with a properly programmed computer to stop the drive system of the document scanner immediately upon discharge of the document into the output hopper and before the succeeding document is fed from the input hopper. When such a halt occurs, it is a simple matter for the operator to manually retrieve the document and attempt to determine the specific nature of the problem. Coded computer outputs can be used to pin-point the problem and also locate it with respect to a particular channel. The operator can quickly determine by examination of the "row zero" portion along the lead edge of the document whether a smudge or extraneous pencil mark has caused the halt. Such smudges and extraneous writing are the most common causes of P-type halts. This condition can be easily verified by visual inspection and the problem solved by simply erasing the extraneous mark or smudge and rerunning the document through the scanner.

Having thus described a preferred embodiment of the invention, it will be obvious to those skilled in the art that I have provided a system which produces automatic tracking on a document-to-document basis thereby permitting the handling of documents having a wide range of reflectances even on a intermixed basis. This permits the most sensitive design of mark detection circuits, and when combined with a multilevel discrimination circuit produces extremely accurate data reading. The system of the invention also provides a powerful self-checking indication of performance to detect individual data channels that are out of tune as well as detecting failure of components within the total system. The system employing the principles of the invention can be used with as few as 10 data channels or with any number of channels in excess of 10. The system obviously requires very little additional logic hardware since it includes the channel amplifier and detection logic normally employed in document scanners. It will be obvious to those skilled in the art that the principles of the invention can be employed on document scanners employing either reflected light or transmitted light systems. It will be further obvious to those skilled in the art that various revisions and modifications can be made in the preferred embodiment shown herein without departing from the spirit and scope of the invention. It is my intention, however, that all such revisions and modifications as are obvious to those skilled in the art will be included within the scope of the following claims.

I claim:

1. In an apparatus for reading a document containing a plurality of data response areas arranged in columns and rows by measuring the intensity of light transmitted from said areas on the document, a system for establishing a basic reference level for measuring said light intensity, said system comprising a plurality of data channels corresponding in number to at least the number of data columns to be read, each data channel including a light sensitive device that produces an analog signal corresponding to the intensity of the light transmitted to it, means providing for the simultaneous scanning by all data channels of an area of the document containing no data, means for averaging the analog signals produced by all data channels during the scanning of said area containing no data, said averaging taking place prior to scanning of the data response areas, means for setting a reference level based upon said averaging of the analog signals from all of the data channels, detection means for detecting a reference level above or below predetermined limits, said detection means being connected to the output of the means for setting said reference level, comparative means in each data channel for comparing said reference level with the analog signal produced by the light sensitive device in each data channel, said comparative means providing an output indicating the magnitude of the analog signal as compared to said reference level, and means for manipulating the output from each of said comparative means to produce an indication of the light intensity detected.

2. The system of claim 1 in which said means for averaging the analog signals produced by the light sensitive devices in said data channels includes a series averaging resistor in each data channel through which said analog signal is fed, a summing resistor connected to said series resistors for averaging the analog signals, a capacitor for storing the average signal, and switching means for selectively connecting said summing resistor to said capacitor or for connecting said capacitor to said means for setting the reference level.

3. The system of claim 2 in which an amplifier is connected to the output of each light sensitive device in each data channel, the output of each amplifier being connected to a respective one of the series resistors and to a respective one of said comparative means, and said means for setting the reference level includes a gain adjustable amplifier, the input of which is connected to said capacitor through said switching means and the output of which is connected to each of said comparative means.

4. The system of claim 3 in which said switching means provides for connection of said summing resistor to said capacitor simultaneously with disconnecting said capacitor from the input of said gain adjustable amplifier, and for connection of said capacitor to the input of said gain adjustable amplifier simultaneously with disconnecting said capacitor from said summing resistor.

5. In an apparatus for reading a document containing a plurality of data response areas arranged in columns and rows by measuring the intensity of light transmitted from said areas on the document, a system for establishing a basic reference level for measuring said light intensity, said system comprising a plurality of data channels corresponding in number to at least the number of data columns to be read, each data channel including a light sensitive device that produces an analog signal corresponding to the intensity of the light transmitted to it, means providing for the simultaneous scanning by all data channels of an area of the document containing no data, means for averaging the analog signals produced by all data channels during the scanning of said area containing no data. said averaging taking place prior to scanning of the data response areas, means for setting a reference level based upon said averaging of the analog signals from all of the data channels including switching logic for setting a test reference level both above and below the typical analog signal of a data channel when scanning the area of said document containing no data, comparative means in each data channel for comparing said reference level with the analog signal produced by the light sensitive device in each data channel, said comparative means providing an output indicating the magnitude of the analog signal as compared to said reference level, said comparative means also comparing each of said test reference levels with the analog signal produced by the light sensitive device when scanning said no data area thereby producing an output from each said comparative means indicative of the performance of each data channel, and means for manipulating the output from each of said comparative means to produce an indication of the light intensity detected.

6. The system of claim 5 in which said means for averaging the analog signals from said data channels includes a series resistor in each data channel through which the analog signal is fed, a summing resistor connected to said series resistors for averaging the analog signals, a capacitor for storing the average analog signal, and switching means for selectively connecting said summing resistor to said capacitor or for connecting said capacitor to said means for setting a reference level.

7. The system of claim 6 in which an amplifier is connected to the output of each light sensitive device in each data channel, the output of each amplifier being connected to a respective one of said series resistors and to a respective one of said comparative means, and said means for setting a reference level includes a gain adjustable amplifier the input of which is connected to said capacitor through said switching means and the output of which is connected to each of said comparative means, said gain adjustable amplifier being connected to said switching logic.

8. They system of claim 7 in which said switching means provides for connection of said summing resistor to said capacitor simultaneously with disconnecting said capacitor from the input of said gain adjustable amplifier and for connection of said capacitor to the input of said gain adjustable amplifier simultaneously with disconnecting said capacitor from said summing resistor.

9. A method for generating a reference level for measuring the analog signals produced in a document scanner having a plurality of data channels, each of which produces an analog signal proportional to the light transmitted from an area on the document, said method comprising: moving a document along a path past a plurality of data channels, said document containing a plurality of data response areas to be read by said data channels; measuring the light transmitted to each data channel from a no print area of the document so as to produce an analog output signal in each channel; averaging the analog output signals of all the data channels; setting a reference level based upon said average signal; setting test reference levels above and below the typical analog output of a single data channel; comparing the analog output signal of each data channel produced from the no print area with each of said test reference levels; utilizing said comparisons to measure the performance of each data channel; measuring the light transmitted to each data channel from each data response area so as to produce an analog signal in each data channel for each data response area; comparing each analog signal produced in each channel from a data response area with said reference level so as to produce an output signal indicating whether said analog signal was greater or less than said reference level; and utilizing said output signal in each channel to produce an indication of the data response area read.

10. The method of claim 9 in which the comparison of the analog output of the data channels produced during the no print area with the test reference levels takes place between the lead edge of the document and the data response area of the document.

11. The method of claim 9 in which said test reference levels and comparisons with the analog output signal of each data channel produced from a no print area are made more than once during the reading of a single document.

12. The method of claim 11 in which the comparison of the analog output signal of each data channel produced from a no print area with each of said test reference levels occurs between the last data response area and the trailing edge of the document.

* * * * *